United States Patent
Hoeflin et al.

(10) Patent No.: US 10,715,450 B2
(45) Date of Patent: *Jul. 14, 2020

(54) METHOD AND APPARATUS FOR ALLOCATING BANDWIDTH FOR A NETWORK

(71) Applicant: AT&T Intellectual Property II, L.P., Atlanta, GA (US)

(72) Inventors: David Hoeflin, Middletown, NJ (US); Yonatan Levy, Manalapan, NJ (US); Xiaowen Mang, Morganville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,812

(22) Filed: Apr. 15, 2019

(65) Prior Publication Data

US 2019/0238466 A1    Aug. 1, 2019

Related U.S. Application Data

(63) Continuation of application No. 15/888,911, filed on Feb. 5, 2018, now Pat. No. 10,263,897, which is a (Continued)

(51) Int. Cl.
| | |
|---|---|
| *H04L 12/803* | (2013.01) |
| *H04W 28/20* | (2009.01) |
| *H04L 12/815* | (2013.01) |
| *H04W 72/08* | (2009.01) |
| *H04W 72/04* | (2009.01) |
| *H04W 72/12* | (2009.01) |
| *H04W 88/08* | (2009.01) |

(52) U.S. Cl.
CPC ............ *H04L 47/125* (2013.01); *H04L 47/22* (2013.01); *H04W 28/20* (2013.01); *H04W 72/08* (2013.01); *H04W 72/0453* (2013.01); *H04W 72/1252* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 5,521,925 | A | 5/1996 | Merakos et al. |
| 6,075,792 | A | 6/2000 | Ozluturk |
| (Continued) | | | |

FOREIGN PATENT DOCUMENTS

EP    1317110    6/2003

OTHER PUBLICATIONS

EP Search Report for EP 07150180, dated May 28, 2008, copy consists of 7 unnumbered pages.

*Primary Examiner* — Brian S Roberts

(57) ABSTRACT

A method and apparatus for performing traffic engineering, e.g., allocating bandwidth, on a wireless access network are disclosed. For example, the method determines a number of subscriber stations (SSs) that a Base Station (BS) is capable of supporting in accordance with at least one performance objective for voice traffic, wherein the at least one performance objective for voice traffic comprises a type of codec. The method then allocates bandwidth by the base station in accordance with the number of subscriber stations that the base station is capable of supporting.

20 Claims, 5 Drawing Sheets

Related U.S. Application Data continuation of application No. 14/949,557, filed on Nov. 23, 2015, now Pat. No. 9,887,922, which is a continuation of application No. 14/028,259, filed on Sep. 16, 2013, now Pat. No. 9,197,567, which is a continuation of application No. 11/618,490, filed on Dec. 29, 2006, now Pat. No. 8,538,449.

(56) References Cited

U.S. PATENT DOCUMENTS

| | | | |
|---|---|---|---|
| 6,097,733 A | 8/2000 | Basu et al. | |
| 6,205,152 B1* | 3/2001 | Von Ahnen | H04Q 11/0478 370/395.63 |
| 6,226,277 B1* | 5/2001 | Chuah | H04L 43/00 370/328 |
| 6,597,660 B1* | 7/2003 | Rueda | H04L 43/0894 370/230.1 |
| 7,769,389 B1 | 8/2010 | Mangal et al. | |
| 8,538,449 B2* | 9/2013 | Hoeflin | H04L 47/22 455/453 |
| 9,197,567 B2 | 11/2015 | Hoeflin et al. | |
| 9,887,922 B2 | 2/2018 | Hoeflin et al. | |
| 10,263,897 B2* | 4/2019 | Hoeflin | H04L 47/22 |
| 2002/0041566 A1* | 4/2002 | Yang | H04L 1/0002 370/229 |
| 2002/0065063 A1 | 5/2002 | Uhlik et al. | |
| 2002/0093983 A1 | 7/2002 | Newberg et al. | |
| 2002/0183064 A1* | 12/2002 | Gopalakrishnan | H04W 52/265 455/452.1 |
| 2003/0103525 A1 | 6/2003 | Wahl | |
| 2003/0199270 A1 | 10/2003 | Hamalainen | |
| 2004/0032828 A1 | 2/2004 | Satt et al. | |
| 2004/0213257 A1 | 10/2004 | Abdelilah et al. | |
| 2005/0074012 A1 | 4/2005 | Garakani et al. | |
| 2005/0124369 A1 | 6/2005 | Attar et al. | |
| 2005/0276219 A1 | 12/2005 | Wang et al. | |
| 2006/0174015 A1 | 8/2006 | Arauz-Rosado | |
| 2007/0195789 A1 | 8/2007 | Yao | |
| 2008/0146240 A1 | 6/2008 | Trudeau | |

\* cited by examiner

METHOD AND APPARATUS FOR ALLOCATING BANDWIDTH FOR A NETWORK

This application is a continuation of U.S. patent application Ser. No. 15/888,911, filed Feb. 5, 2018, now U.S. Pat. No. 10,263,897, which is a continuation of U.S. patent application Ser. No. 14/949,557, filed Nov. 23, 2015, now U.S. Pat. No. 9,887,922 which is a continuation of U.S. patent application Ser. No. 14/028,259, filed Sep. 16, 2013, now U.S. Pat. No. 9,197,567 which is a continuation of U.S. patent application Ser. No. 11/618,490, filed Dec. 29, 2006, now U.S. Pat. No. 8,538,449, all of which are herein incorporated by reference in their entirety.

The present invention relates generally to communication networks and, more particularly, to a method for performing quality of service based traffic engineering, e.g., allocating bandwidth, for a communication network.

BACKGROUND OF THE INVENTION

The Internet has emerged as a critical communication infrastructure, carrying traffic for a wide range of important applications. For example, Internet services such as Voice over Internet Protocol (VoIP) and Service over Internet Protocol (SoIP) are delivered to customers at any location with an Internet connection. A customer may access VoIP services via a variety of access networks such as cable networks, Digital Subscriber Line (DSL) networks, wireless networks, etc. Cable and DSL provide high speed broadband access on wired connections that limit the mobility of users. As more and more customers are accessing services using mobile end-devices, the wireless broadband access networks are becoming ubiquitous. In addition, in suburban and rural communities without cable or DSL, the cost of extending wired broadband access is impractical. A wireless broadband access network called WiMax is becoming more and more the access network of choice.

WiMax is able to support broadband access while not limiting users to wired connections. However, the bandwidth on WiMax network is shared among users in a given radio sector. If too many subscribers access the shared bandwidth simultaneously, congestion may occur and performance objectives may not be met. The network service provider needs to determine the number of subscribers that can be supported while meeting the performance objectives. The performance objectives depend on the type of traffic. For example, voice traffic is known to have more stringent delay requirement as compared to that of data traffic. Traditionally, the bandwidth requirement to support a predetermined number of concurrent calls for each sector is determined using an Erlang B model that assume all voice conversations take the same amount of bandwidth. However, the voice traffic from multiple customers may have different bit rate due to the use of different codec technologies.

Therefore, there is a need for a method that allocates bandwidth for a wireless access network.

SUMMARY OF THE INVENTION

In one embodiment, the present invention discloses a method and apparatus for performing traffic engineering, e.g., allocating bandwidth, on a wireless access network. For example, the method determines a number of subscriber stations (SSs) that a Base Station (BS) is capable of supporting in accordance with at least one performance objective for voice traffic, wherein the at least one performance objective for voice traffic comprises a type of codec. The method then allocates bandwidth by the base station in accordance with the number of subscriber stations that the base station is capable of supporting.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for performing traffic engineering, e.g., allocating bandwidth, on wireless access networks used for services such as VoIP and SoIP. Although the present invention is discussed below in the context of packets for VoIP and SoIP services, the present invention is not so limited. Namely, the present invention can be applied for any service with mobile customers. Similarly, the present invention can be implemented on other networks such as the cellular network, the time division multiplexed network, etc.

Figure 1:
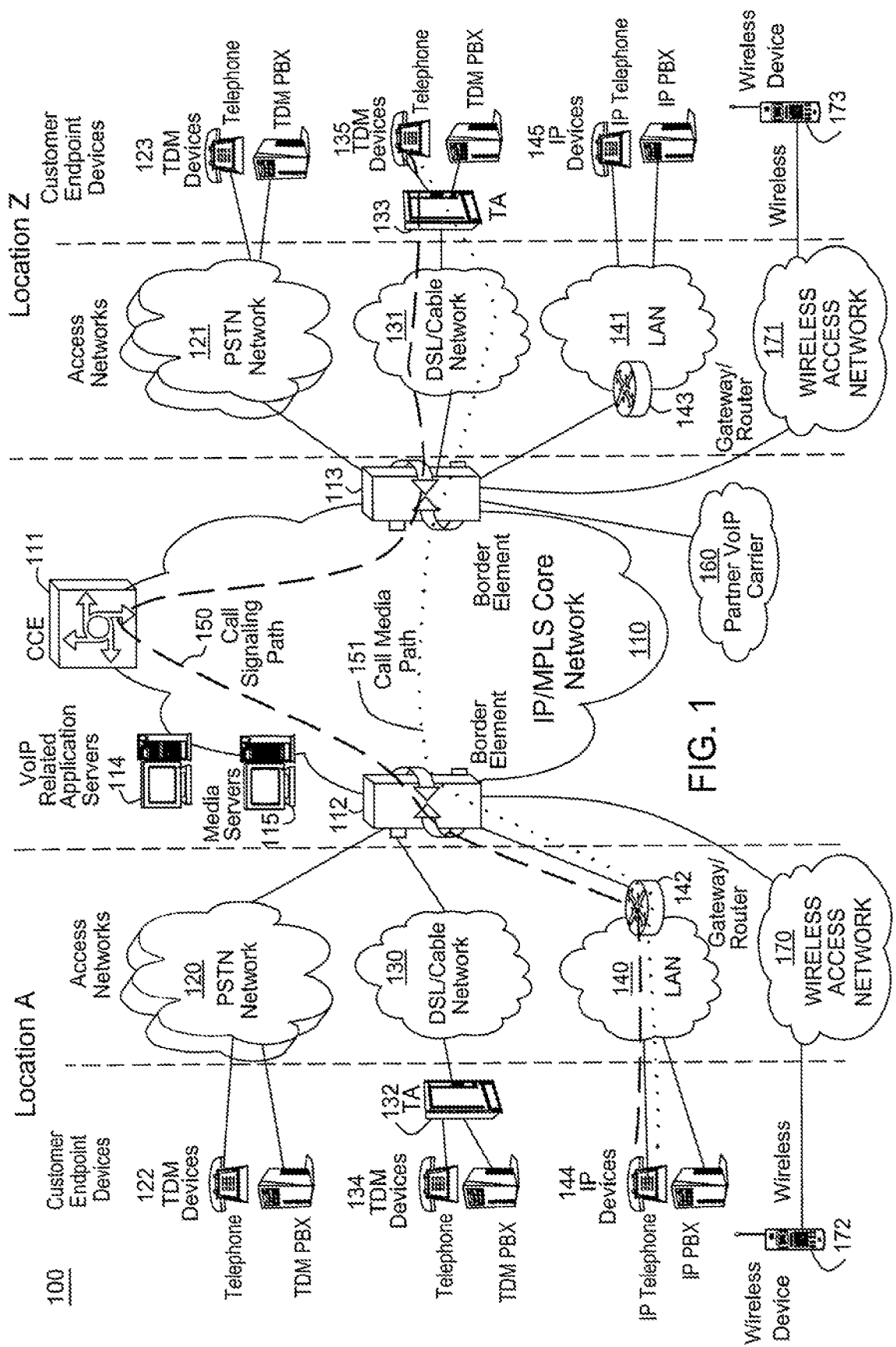
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based, IP based or wireless such as cellular phones. TDM based customer endpoint devices 122, 123, 134, and 135 typically comprise of TDM phones or Private Branch Exchange (PBX). IP based customer endpoint devices 144 and 145 typically comprise IP phones or IP PBX. Wireless endpoint devices 172 and 173, typically comprise cellular phones, pocket PCs etc. The wireless endpoint devices 172 and 173 may be connected to the wireless access network directly or through a subscriber station. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 which has a VoIP gateway router 142 or 143, as shown in FIG. 1. Wireless endpoint devices may access VoIP services by using wireless access networks 170 and 171. The wireless access networks 170 and 171 are connected to the IP core network 110 through the border elements 112 and 113, respectively.

The access networks for wired devices can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices. The access networks for wireless devices 170 and 171 can be Worldwide Interoperability for Microwave Access (WiMax), Wireless Local Area Networks (WLAN) or Wireless Wide Area Networks (WWAN).

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which services are provided on networks such as VoIP and SoIP networks. Businesses are now able to expand their customer base beyond their local area network based on reaching customers via the Internet. For example, a VoIP service customer can subscribe to a service and may wish to access the service via an IP device from anywhere. For example, a customer of a VoIP service may be traveling away from the wired IP device (at home or office) when he/she wishes to access services. For example, a customer may wish to access services via a laptop computer while traveling in a car, train, etc. Customers then may access the VoIP or SoIP service via a wireless broadband access network, e.g., WiMax. The customers expect to receive the same quality of service regardless of the type of access network (wired or wireless).

However, the bandwidth on a wireless access network such as WiMax is shared among many users in a given radio sector. If too many subscribers access the shared bandwidth simultaneously, congestion may occur resulting in diminished (reduced) performance. Thus, the network service provider needs to determine the number of subscribers that can be supported on a wireless access network while meeting the performance objectives. The performance objectives depend on the type of traffic. For example, voice traffic is known to have more stringent delay requirement as compared to that of data traffic.

The bandwidth requirement to support a pre-determined number of concurrent calls for each sector can be determined using Erlang B models that assume all voice conversations consume the same amount of bandwidth. However, the voice traffic may have different bit rate due to the use of different codec technologies. The network service providers may apply the Erlang B model assuming the largest possible bit rates for each conversation. Unfortunately, if customers are using more efficient codecs, then calls may be blocked while the network is actually not fully utilized and available bandwidth is being wasted. Therefore, there is a need for a method that allocates bandwidth for a wireless access network that is based on at least one performance objective.

The current invention discloses a method and apparatus for providing traffic engineering, e.g., allocating bandwidth, for a wireless access network used to access services such as VoIP and SoIP. In order to clearly illustrate the teachings of the current invention, the following terminologies and networking concepts will first be described:

Worldwide Interoperability for Microwave Access (WiMax);
Subscriber Station (SS); and
Base Station (BS).

Worldwide Interoperability for Microwave Access (WiMax) refers to a standards based technology enabling the delivery of last mile wireless broadband access according to IEEE 802.16 wireless network standards, as an alternative to cable and Digital Subscriber Line (DSL) broadband access networks.

Subscriber Station (SS) refers to a customer premise or endpoint device that is used to communicate with a base station (described below). It should be noted that the SS may be shared among other customer data and/or voice packet originating devices. For example, a router, a switch, etc. may be built with a radio frequency transmitter and receiver to communicate with a WiMAX tower that serves as a base station. In another example, the SS may be a laptop computer that is directly communicating with the BS.

Base Station (BS) refers to a transceiver station that is deployed to handle all incoming and outgoing calls from multiple subscriber stations.

The total bandwidth a base station can support is divided into several sectors. The bandwidth for each sector varies depending on the environment and the distance between the subscriber stations and the base station. For example, in cities with physical obstructions the useful bandwidth may be limited to lower frequency transmissions, e.g. 2-10 GHz. If there are no physical obstructions, WiMAX transmissions may reach about 70 GHz.

The bandwidth for each sector is shared by multiple subscriber stations. If there are too many simultaneous subscriber stations trying to access the shared bandwidth, congestion may occur. Under congestion, IP packets may experience reduced performance. Thus, the service provider performs traffic engineering to determine the maximum number of SS that may be supported subject to one or more performance objectives.

In one embodiment, the current invention provides a traffic engineering method for a wireless access network that is based on the performance objectives of packets. The service provider determines the performance objectives for voice and data packets for each subscriber station. For example, the data traffic for each subscriber station may be stated by the following parameters:

Average rate of traffic (bit rate);
Allowable peak rate;
Average burst length during peak transmission; and
Active factor that measures how frequently the subscriber station transmits at peak transmission rate.

The voice traffic for each subscriber station may be stated similarly in accordance with various parameters, e.g., a maximum number of allowed concurrent calls, an average length of calls, a number of calls for a given period of time (Erlang load), etc. The traffic descriptors for voice packets may be negotiated with the customer prior to the SS being added to a BS sector. Table 1 provides an example of traffic descriptors for an SS.

TABLE 1

An Example of Traffic Descriptors for an SS.

| | |
|---|---|
| SS Identification | IP address x.y.z |
| Maximum number of concurrent voice calls $V_s$ | 5 |
| Erlang load per voice line $\rho_s$ | 20 per hour |

For the example above, the $6^{th}$ call ($V_s+1$) may be dropped at the SS. The Erlang load per voice line is 20 per hour. If the actual call volume per voice line exceeds the contracted Erlang load, the SS may experience more blocked calls than the target blocked call numbers. For example, if target call blocking is 1%, the SS that exceeds the contracted Erlang load may experience 10% blocking and so on.

The different performance objectives for voice and data packets are maintained while the packets are integrated at a base station. For example, voice and data packets may experience different delay through the network based on their respective performance criteria.

For the combined data and voice shared model, a customer may buy a service that includes any combination of data and voice traffic. The customer may choose the peak transmission rate for data packets, e.g., 2 Mbps or 5 Mbps. The voice traffic for a SS may be specified in terms of the maximum number of concurrent calls that can be supported, $V_s(i)$. The Erlang load for SS i represented as $\Box \rho_s(i)$ is negotiated between "the customer using the SS" and "the network service provider managing the BS." Each SS may have admission control and may limit the number of concurrent calls. For example, an enterprise customer may have w number of voice lines provisioned at the SS and the actual traffic load behind the SS may be x number of calls. If x is greater than w, the SS may perform admission control to limit the number of concurrent calls. Actual voice caller's experience depends on the number of voice lines provisioned at the SS and actual traffic load behind each SS. For calls, e.g. VoIP calls that pass the admission control at the SS, the performance objective may be pre-defined (e.g., 1% blocking) at the BS. Hence, the BS also has an admission control mechanism.

In one embodiment, the current invention treats voice packets with a highest priority at the BS. Note that the arrival process and service process are independent of each other and also independent of the number of packets in queue. In order to fulfill the various performance objectives for the voice and data packets, in one embodiment, the current invention performs traffic engineering by combining the Equivalent Bandwidth (EB) model, Markov Modulated Poisson Process (MMPP), and the Erlang B model as described below.

The Equivalent Bandwidth (EB) model refers to a data traffic engineering model used in Asynchronous Transfer Mode (ATM) networks. The EB model is used in ATM networks to determine how many ATM connections an ATM port with a fixed bandwidth can support. The EB model also includes analysis of packet arrival patterns (including arrival of empty packets) to model bursty traffic. In some cases, the number of customers that may share a sector is limited. For example, if large enterprise customers are sharing a sector, then the bandwidth available may be used up by a few enterprise customers. For cases with a few large customers, the burstiness of the traffic has significant impact on the bandwidth consumption. For applications with a large number of sources, the Central Limit Theorem (CLT) applies and traffic may be modeled using the Gaussian (normal) distribution. The EB model is also used to link the engineering rules to the business requirements such as packet delay requirements. For example, the burstiness of the traffic may affect the bandwidth consumption and consequently may affect the delay experienced by the packets.

There are many EB models that are suitable for general traffic characteristics. However, using traffic models that capture the essence of traffic dynamics is more efficient. Markov Modulated Poisson Process (MMPP) is a traffic model used for capturing burstiness of data traffic. The MMPP is a modulated Poisson process whose rate is determined by an m-state Markov chain. Each state of the Markov chain is characterized by a bit rate and a mean holding time. For example, in a two-state MMPP, the two states may be state 1 and state 2. Then, in state 1 the mean holding time is period1 with arrival rate Peak_rate. In state 2, the mean holding time is period2 with arrival rate rate2. For the two-state MMPP, the traffic mean rate is determined by:

Mean rate=Peak_rate*period1/(period1+period2)+
rate2*period2/(period1+period2)

where, period1/(period1+period2) is referred to as active factor. That is, Active_factor=period1/(period1+period2).

Active factor measures how frequently a customer peaks. The data volume transmitted during the peak period is called burst size and it can be derived as: Burst_size=Peak_rate*period1. The peak state (state 1) models the traffic when a subscriber station sends or receives a big volume of data over a data link. The state 2 models quiet periods of users' activities such as short emails exchanges. When rate2 In the MMPP model is equal to zero, the model becomes an On-Off model. On-Off model is similar to human conversation pattern and may be used for modeling voice traffic. The "On" period describes the conversation duration and it is exponentially distributed, whereas the "Off" period is the time interval between two consecutive calls. It should be noted that the data rate during the conversation is determined by the codec used at the SS. Thus, an efficient codec may lead to the efficient use of bandwidth inside the network.

Figure 2:
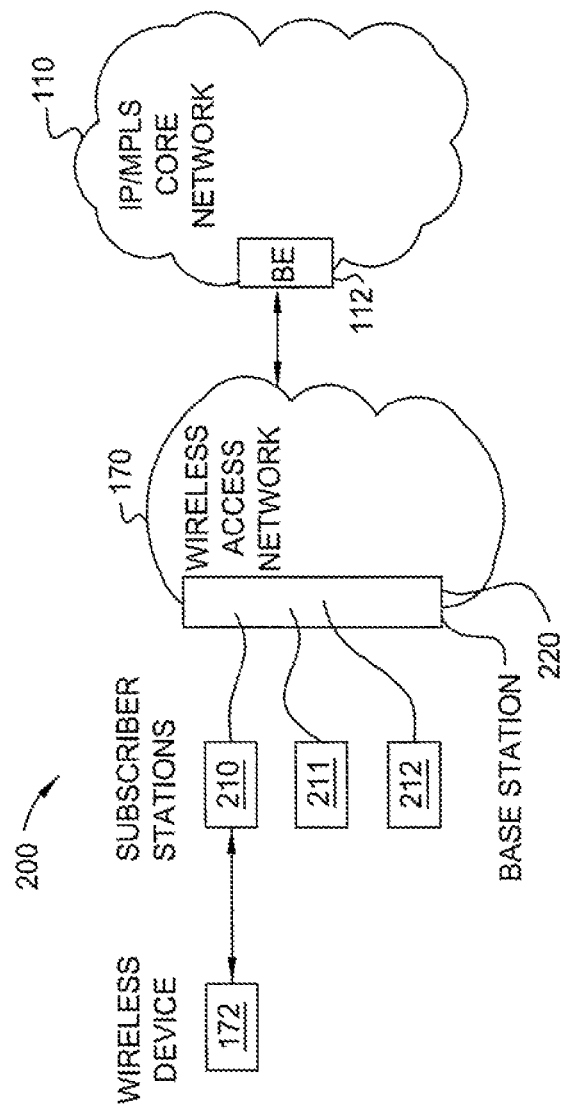
FIG. 2 illustrates an exemplary WiMAX access network.

FIG. 2 illustrates an exemplary WiMAX access network 200. Subscriber Stations (SS) 210, 211 and 212 share Base Station (BS) 220. A wireless endpoint device 172 is connected to an SS 210 for sending and receiving packets. Base station 220 is located on a wireless access network 170. The access network 170 is connected to an IP/MPLS core network 110 through a gateway router or a border element 112.

Figure 3:
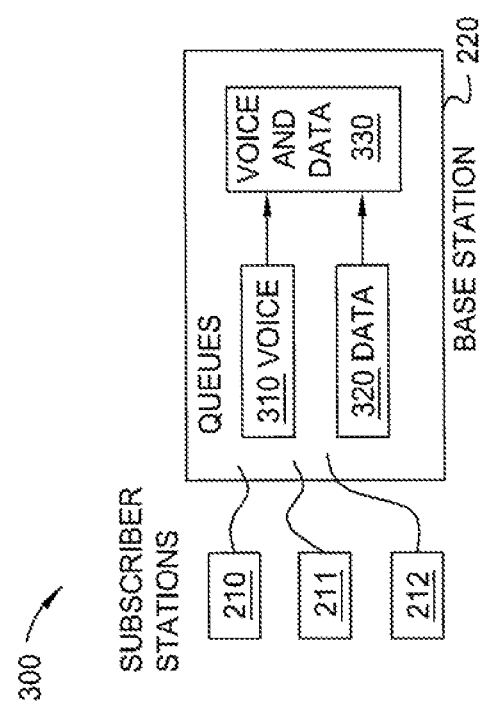
FIG. 3 illustrates an exemplary queuing system for voice and data packets at a base station.

FIG. 3 illustrates an exemplary queuing system 300 for voice and data packets at the BS. In one embodiment, the base station 220 implements a two-priority queuing system: one for packets for voice traffic and one for packets for data traffic. In one embodiment, the packets for voice traffic are placed into a queue with the highest priority, whereas the data traffic may only consume the leftover bandwidth after all the packets for the voice traffic have been transported. For example, the subscriber stations 210, 211 and 212 transmit voice and data packets to the BS 220. Voice packets are directed to queue 310 and data packets are directed to queue 320. The voice and data packets are multiplexed in queue 330 and forwarded towards their destination. The aggregate Erlang load of voice packets arriving at the queue 310 from N subscriber stations may be determined from:

$\rho_{bs}=\Sigma\rho_s(i), i=1, \ldots, N$.

The maximum concurrent voice lines that may be supported is determined and provisioned at a BS sector by applying the Erlang B model with specified target blocking at the BS. Let, $V_{bs}$ represents the maximum number of concurrent voice calls a BS sector may allow subject to a specified blocking target. The bandwidth to be allocated to the voice traffic at the BS sector may then be determined as a product of codec bit rate and $V_{bs}$.

In one embodiment, the current invention applies the EB model for capacity planning on a wireless access network such as the WiMax network. In one embodiment, an EB model that extracts the first two moments from traffic characteristics of subscriber stations is used. The first two moments are used as model inputs. The EB method also uses a delay threshold at a given percentile, as a design constraint, e.g., 10 ms at 99th percentile. The maximum number of subscriber stations $N_{max}$, a sector with capacity C, can support while satisfying the specified performance objective may be determined from equivalent capacity $C_{eq}$. For example, for a base station with only data traffic, the maximum number of subscriber stations $N_{max}$ such that $C_{eq}(N_{max})<=C$ and $C_{eq}(N_{max}+1)>C$ may be calculated.

There are many equivalent EB models. Those skilled in the art would realize that other EB models may be used with similar results. The above EB model is not intended to limit the current invention.

For a base station that supports both data and voice traffic, the bandwidth required for each sector at the BS, to support "n" subscriber stations (SS) with $V_s$ concurrent calls per SS may be determined by Erlang B model subject to a blocking objective (e.g., 1%). Let $C_v(n)$ represent the total bandwidth required for supporting the voice traffic for all "n" subscribers in a sector at a BS. $C_v(n)$ may then be determined from the codec bit rate and the maximum number of concurrent voice calls for a given BS sector $V_{bs}$. For example, if the codec bit rate is represented by "CodecBitRate", $C_v(n) = V_{bs}*$CodecBitRate.

In one embodiment, the current invention performs capacity planning by combining the Erlang B model and EB model as described above to find the maximum supportable SS when traffic for each SS may contain any combination of data and voice, of the same codec technology, packets.

However, there are many types of codecs generating different bit rates, e.g., 32 Kbps codec built in accordance with G.729 International Telecommunications Union (ITU) standards, 89 Kbps codec built in accordance with G.7111 ITU standards, and so on. The above equation for determining $C_v(n)$ may be used when all the SSs in a sector use the same codec technology. Given that Erlang B model is derived for the traditional voice model where all conversations use the same amount of bandwidth, it is no longer a valid approach for the problem of heterogeneous (different codec technologies) voice bit rates.

The EB model described above for data traffic can handle the heterogeneous traffic conditions. However, the performance objectives are in terms of packet-level performance, not call-level blocking. In one embodiment, the current invention assigns the highest priority to voice calls. When voice calls are assigned the highest priority, the blocking probability may be approximated as the probability that the queue length is bigger than zero.

In one embodiment, each voice line is modeled as an On-Off traffic to determine $C_v(n)$. The On-Off traffic model is a special case of the two-state MMPP where the peak rate is the codec bit rate and the state2 rate is zero. The EB model may then be applied using the blocking probability as loss probability and delay threshold as zero. The EB model treats each voice line as an individual On-Off traffic source with its associated traffic descriptors. For data traffic, the EB model is applied to the leftover bandwidth. For example, $C_{eq}$ may be calculated by applying EB to the leftover bandwidth $C-C_v(n)$. The maximum number of SS that a BS sector may support $N_{max}$, is then determined as the maximum n such that $C_{eq}(n)+C_v(n)<=C$.

In one embodiment, the current invention performs capacity planning by combining the two tiers of EB approach while taking into account codec differentiation as described above to find the maximum supportable SS when traffic for each SS may contain any combination of data and voice packets.

In one embodiment, the current invention performs on-line service provisioning admission and traffic management by combining the Erlang B model and EB model as described above. For example, the network service provider may negotiate Erlang load for each SS with the customers and monitors actual Erlang load on an ongoing basis. If an SS exceeds negotiated Erlang load for its voice calls constantly, it may cause other SSs within the sector to experience higher blocking due to the call admission control at the BS sector. In order to maintain the blocking objective for all voice calls, the BS may implement a procedure to prevent the SSs that are compliant to negotiated Erlang load from being blocked unfairly due to others' excessive use of the available bandwidth. For example, if 2 SSs are in the same BS sector and one of them is using the entire capacity, then the $2^{nd}$ SS cannot access services. The BS may then implement a procedure that increases the blocking rate for the SS that violated the negotiated Erlang load such that the SS that is complying with the negotiated Erlang load may continue to access services.

In one embodiment, the current invention provides a method to block calls from aggressive subscribers (e.g., subscribers that violate their negotiated Erlang load) before the voice lines at the BS sector are fully occupied. The method to block calls from aggressive subscribers may use a call load monitoring system to identify the SSs that violate the negotiated Erlang loads. The call load monitoring system may also determine by how much the negotiated load is exceeded for each SS. Let $\Delta \rho_s(i)$ represent the amount of load that exceeds the contracted volume for SS number "i", denoted as SS(i). Voice call requests from SS(i) with $\Delta \rho_s(i) > 0$ are then blocked when the number of concurrent calls at a BS sector is greater than or equal to $\text{Min}\{[V_{bs}-1], V_{bs}*[1-\Delta \rho_s(i)/\rho_{bs}]\}$. All other call requests from well behaved SSs are blocked only when the number of concurrent calls is $V_{bs}$.

In one embodiment, the current invention updates $\Delta \rho_s(i)$ based on real-time measurements using a moving time window.

In another embodiment, the network service provider notifies customers whose call requests exceed negotiated load such that the customers with such SS may revise their service plan. For example, a customer may upgrade the service level rather than experiences a higher blocking rate than the negotiated target.

In the above discussion of the method for blocking calls, all SSs are presumed to use the same codec technology. But as mentioned previously, it is possible for different subscribers to use different codec technologies and to be multiplexed on the same BS sector. In one embodiment, the current invention utilizes a two tiered EB model to determine the required bandwidth while satisfying the various performance objectives for heterogeneous traffic conditions.

Let, $\lambda_i*$ be the contractual call arrival rate from SS i $p_i*$ be the contractual call blocking for voice lines out of SS i $\rho_i*$ be the contractual Erlang load for SS i $\lambda_i$ be the actual call arrival rate from SS i $p_i$ be the actual call blocking for SS i $\rho_i$ be the actual Erlang load from SS i CodeBitRate(i) be the code bit rate generated by voice lines from SS i Then, the targeted total number of arrived calls for a period of time $\Delta T$ is: $\Delta T \lambda_i**$. The targeted number of blocked calls is $\Delta T \lambda_i* p_i*$. The fair share of blocked calls for calls originated from SS i is then defined as:

$$\Delta T \lambda_i * p_i * / \Sigma \Delta T \lambda_i * p_i * = \lambda_i * p_i * / \Sigma \lambda_i * p_i *.$$

Similarly, we calculate the targeted fair share of arrival traffic load from SS i as:

$$\Delta T \rho_i * \text{CodeBitRate}(i) / \Sigma \Delta T \rho_i * \text{CodeBitRate}(i)$$
$$= \rho_i * \text{CodecBitRate}(i) / \Sigma \rho_i * \text{CodeBitRate}(i)$$

When heterogeneous voice lines are multiplexed together, a group of voice lines may experience a higher blocking probability than the objective (i.e. may experience unfair call blocking). In one example, some voice lines do not confine their Erlang load to contractual target load and have excessive call rate or call holding time. In the current invention, an SS that exceed the contracted Erlang load is referred to as a non-conforming SS. Calls from a non-conforming SS are referred to as non-conforming calls. In another example, if no intelligence is implemented, voice lines with higher bit rate may experience higher blocking when multiplexed with voice lines with lower bit rate. In the current invention, calls from an SS that conforms to the contracted Erlang load are referred to as conforming calls.

The current invention provides a method to block non-conforming calls such that their SS throughput is limited to its contractual levels. The blocking method uses a load monitoring system to identify the SSs that violate the negotiated Erlang load and the amount of load that exceeds the negotiated load for each SS. Let, $\Delta \rho_i = (\rho_i - \rho_i*)^+$ represents the amount of load that exceeds the negotiated Erlang load. Let the maximum codec bit rate for conforming calls from SSi whose actual load does not exceed the target, i.e. $\rho_i <= \rho_i <= \rho_i*$, be $C_{codec\_nc}$. Voice call requests from SS i with $\Delta \rho_i > 0$, are blocked when the bandwidth in use at the BS sector is greater than or equal to:

$$\min\{[C_v(n) - C_{codec\_nc}],$$

$$C_v(n)[1 - \Delta \rho_i \text{CodecBitRate}(i) / \Sigma \rho_i * \text{CodeBitRate}(i)]\}$$

All other call requests from conforming subscriber stations are blocked only when there is no available bandwidth. For the latter case (no available bandwidth), the current invention enforces the blocking fairly by applying preventive blocking threshold to re-distribute the blocking among all active voice lines.

In one embodiment, for all conforming voice calls, the ratio $\lambda_i p_i / \Sigma \lambda_i p_i$ is updated after each call arrival and a target ratio is established. Let $C_{codec}$ represents the maximum codec bit rate for calls whose ratio exceeds the target, i.e., $[\lambda_i p_i / \Sigma \lambda_i p_i] > [\lambda_i * p_i * / \Sigma \lambda_i *]$. Calls whose ratio $\lambda_i p_i / \Sigma \lambda_i p_i < \lambda_i * p_i * / \Sigma \lambda_i * p_i *$ and whose $\lambda_i > 0$ are rejected if the bandwidth in use at the BS sector $> C_v - C_{codec}$. Calls are rejected if there is not enough available bandwidth. Note that $\Delta T \lambda_i p_i$ is the actual expected number of blocked calls for a time period of $\Delta T$ based on current measurements for SS i. Similarly, $\Delta T \Sigma \lambda_i p_i$ is the expected total number of blocked calls for a time period of $\Delta T$ from all SS. Thus, measurements to derive $\lambda_i p_i / \Sigma \lambda_i p_i$ need to be invoked only when call blocking occurs. In other words, the implementation overhead of this method is very limited.

Note that above procedures are based upon the assumptions that all voice lines belonging to the same SS are using the same codec and will have the same blocking requirement. However, one can easily generalize those procedures to scenarios where voice lines out of the same SS coming from different VoIP gateways that can use different codec technologies.

In one embodiment, the data traffic arrival processes to the SS and the data packets departure process at the BS are captured as a single server to capture the queuing delay as the total delay for crossing both the SS and the BS. The delay for a packet is then determined as the time between when a packet arrives to an SS and the packet is sent out by the BS. The performance objective may be provided as a percentage of packets from all subscriber stations exceeding a predefined delay threshold to cross the entire system. Note that the model captures accurately the queuing delay regardless of whether the packets wait at the SS or the BS.

In one embodiment, performance objectives include delay criteria, packet loss criteria, etc. for each service.

In one embodiment, data traffic performance objective is specified as a delay threshold of a pre-defined percentile and is also guaranteed at the BS.

In one embodiment, the current method for performing traffic engineering for a wireless access network may be implemented as a standalone tool for capacity planning.

In another embodiment, the current method for performing traffic engineering for a wireless access network may be implemented as an online tool embedded in a service provisioning system or a process to determine whether a new subscriber station should be added to a sector.

Figure 4:
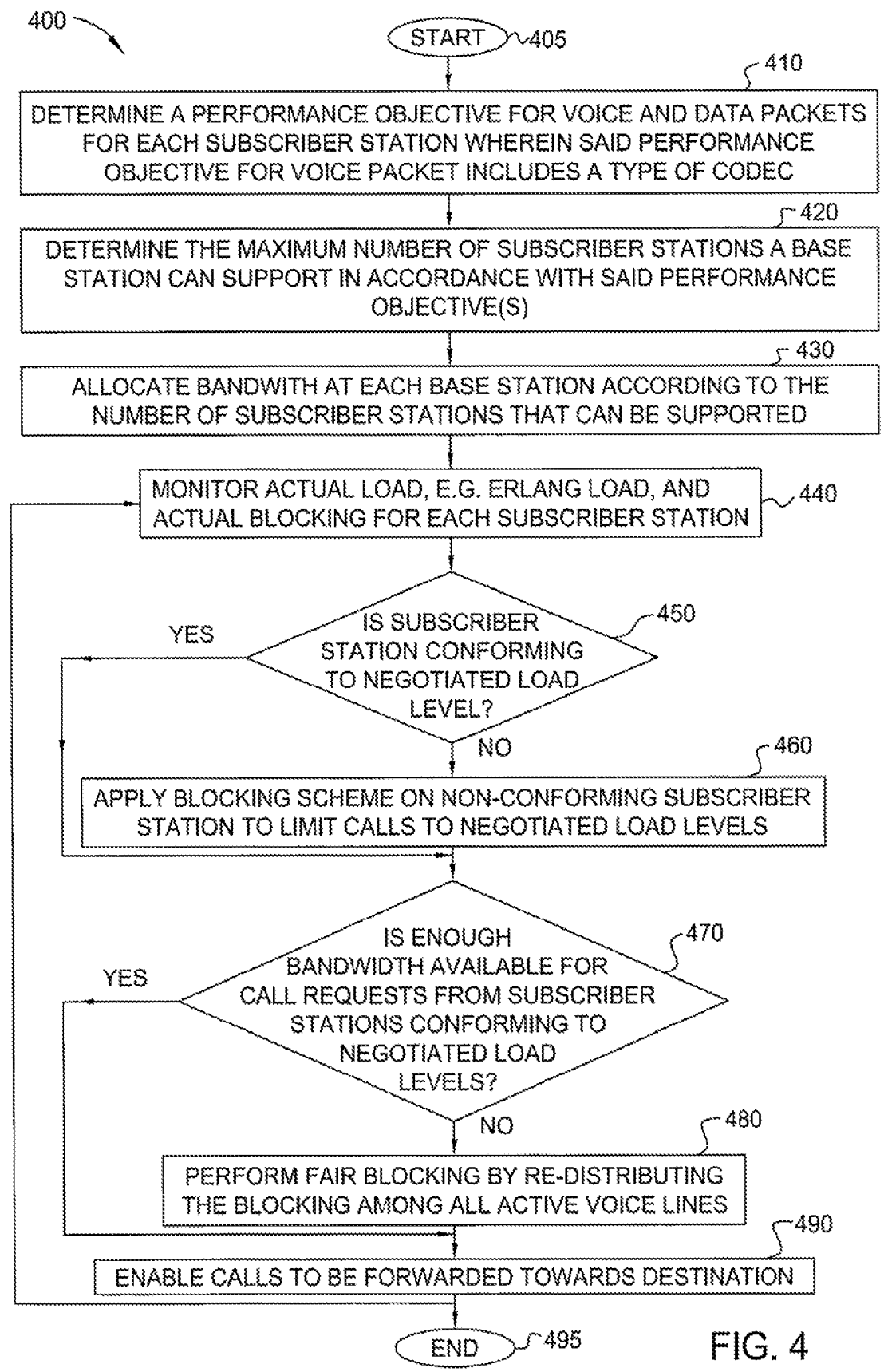
FIG. 4 illustrates a flowchart of a method for performing traffic engineering on wireless access networks.

FIG. 4 illustrates a flowchart of a method 400 for performing traffic engineering, e.g., allocating bandwidth, on a wireless access network. Method 400 starts in step 405 and proceeds to step 410.

In step 410, method 400 determines at least one performance objective for voice and data packets for each subscriber station wherein the at least one performance objective for voice packet includes a type of codec. For example, the service provider may negotiate the one or more performance objectives with the customer. For example, the performance objective for data traffic for each subscriber station may contain an average bit rate, allowable peak-rate, average burst length during peak transmission, and active factor. For example, the performance objective for voice traffic for each subscriber station may contain a type of codec, the maximum number of concurrent voice calls, the load (e.g. Erlang load) per voice line, etc.

In step 420, method 400 determines the maximum number of subscriber stations that a base station can support in accordance with said one or more performance objectives. For example, the network service provider may perform capacity planning by combining the Erlang B model and EB model while taking into account codec homogeneity to determine the number of SSs that may be supported by a BS. In one embodiment, the network service provider may perform capacity planning by using two tiers of EB model while taking into account codec differentiation to determine the number of SSs that may be supported by a BS.

In step 430, method 400 allocates bandwidth at each base station according to the number of SSs that can be supported. For example, if all the customers sharing a BS are using efficient codecs, then the bandwidth allocated for each conversation is smaller and the blocking rate may be reduced (i.e. more calls may be accepted).

In step 440, method 400 monitors actual load, e.g. Erlang load and actual blocking, for each subscriber station on an ongoing basis and determines whether or not the subscriber stations are conforming or non-conforming to negotiated load levels and also whether or not the subscriber stations are blocked to negotiated blocking targets.

In step 450, method 400 determines whether or not the SS is conforming or non-conforming to negotiated load level. For example, the method compares the actual Erlang load with the negotiated Erlang load. If the SS is conforming, the method proceeds to step 470. Otherwise, the method proceeds to step 460.

In step 460, method 400 applies a blocking scheme on non-conforming SSs to limit calls from non-conforming SSs to their negotiated levels (contractual levels). For example, if an SS is using twice the negotiated Erlang load, then the blocking rate may be doubled to limit throughput to the negotiated level.

In step 470, method 400 determines whether or not enough bandwidth is available for call requests from subscriber stations that did not exceed the negotiated number of call requests (conforming calls). If there is enough bandwidth, the method proceeds to step 490 to allow all calls from conforming SS to proceed. Otherwise, the method proceeds to step 480 to apply blocking fairly.

In step 480, method 400 performs fair blocking by applying preventive blocking threshold to re-distribute the blocking among all active voice lines. For example, if all SSs are conforming but one SS is at 100% of the negotiated blocking target while another SS is at 50% of the negotiated blocking target, some calls for the SS at 50% of negotiated blocking target may be dropped (or blocked) to allow the other SSs to acquire the bandwidth.

In step 490, method 400 enables calls to be forwarded towards their destination. The method then proceeds to step 495 to end the current process or returns to step 440 to continue monitoring actual Erlang load and actual blocking for each SS.

Figure 5:
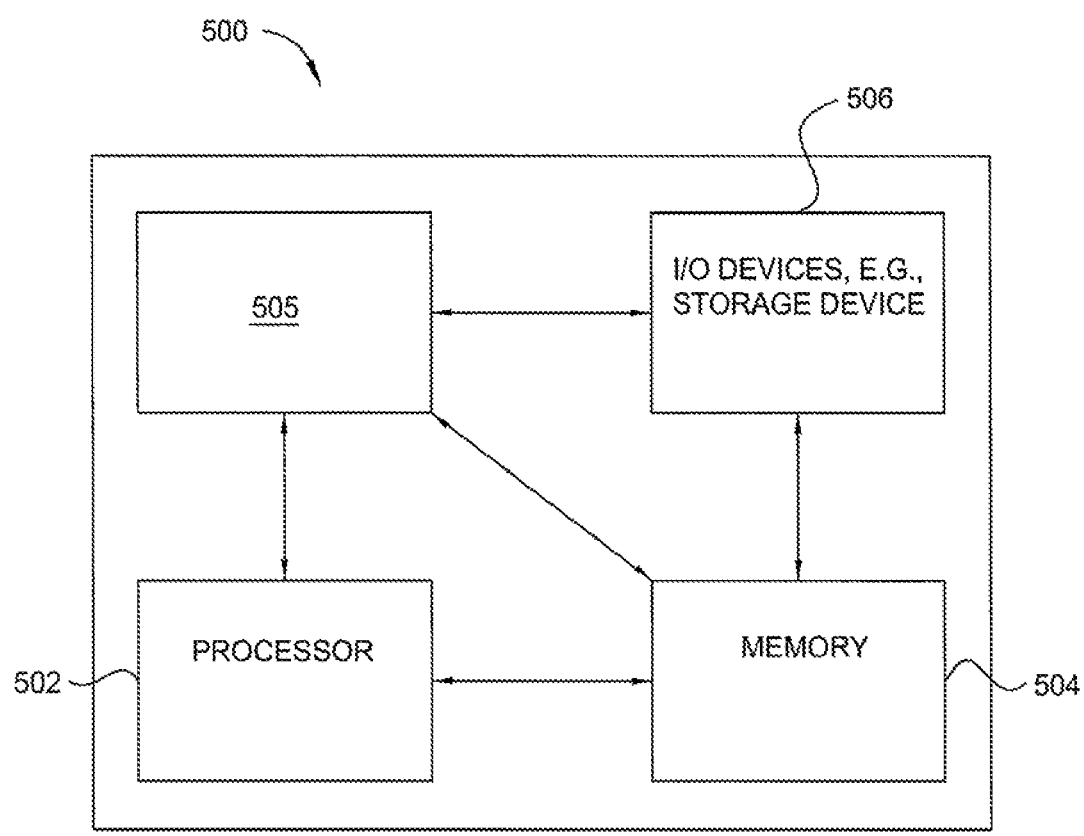
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 4, the system 500 comprises a processor element 502 (e.g., a CPU), a memory 504, e.g., random access memory (RAM) and/or read only memory (ROM), a module 505 for performing traffic engineering for a wireless access network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for performing traffic engineering for a wireless access network can be loaded into memory 504 and executed by processor 502 to implement the functions as discussed above. As such, the present method 505 for performing traffic engineering for a wireless access network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for allocating a bandwidth for a network, the method comprising:

determining, by a base station, a number of subscriber stations that the base station is capable of supporting in accordance with a performance objective for data traffic and a performance objective for voice traffic, wherein the performance objective for data traffic comprises an allowable peak rate, wherein the performance objective for voice traffic comprises a load per voice line, wherein the determining is performed using an equivalent bandwidth model; and allocating, by the base station, the bandwidth in accordance with the number of subscriber stations that the base station is capable of supporting.

2. The method of claim 1, further comprising:

monitoring an actual load for each of the subscriber stations;

monitoring an actual blocking for each of the subscriber stations;

determining whether each of the subscriber stations is conforming or non-conforming to a negotiated load level for each of the subscriber stations; and determining whether or not each of the subscriber stations is blocked in accordance with a negotiated blocking target.

3. The method of claim 2, further comprising:

applying a first blocking scheme to a subscriber station of the subscriber stations that is determined to be non-conforming so that the subscriber station that is determined to be non-conforming is limited to the negotiated load level for the subscriber station that is determined to be non-conforming.

4. The method of claim 3, further comprising:

performing a second blocking scheme that redistributes a blocking rate among a plurality of active voice lines.

5. The method of claim 1, wherein the voice traffic is treated with a highest priority by the base station versus the data traffic.

6. The method of claim 5, wherein the voice traffic and the data traffic use separate queues at the base station.

7. The method of claim 1, wherein the network is a wireless access network.

8. A non-transitory computer-readable storage medium storing a plurality of instructions which, when executed by a processor of a base station, cause the processor to perform operations for allocating a bandwidth for a network, the operations comprising:

determining a number of subscriber stations that the base station is capable of supporting in accordance with a performance objective for data traffic and a performance objective for voice traffic, wherein the performance objective for data traffic comprises an allowable peak rate, wherein the performance objective for voice traffic comprises a load per voice line, wherein the determining is performed using an equivalent bandwidth model; and allocating the bandwidth in accordance with the number of subscriber stations that the base station is capable of supporting.

9. The non-transitory computer-readable storage medium of claim 8, the operations further comprising:

monitoring an actual load for each of the subscriber stations;

monitoring an actual blocking for each of the subscriber stations;

determining whether each of the subscriber stations is conforming or non-conforming to a negotiated load level for each of the subscriber stations; and determining whether or not each of the subscriber stations is blocked in accordance with a negotiated blocking target.

10. The non-transitory computer-readable storage medium of claim 9, the operations further comprising:

applying a first blocking scheme to a subscriber station of the subscriber stations that is determined to be non-conforming so that the subscriber station that is determined to be non-conforming is limited to the negotiated load level for the subscriber station that is determined to be non-conforming.

11. The non-transitory computer-readable storage medium of claim 10, the operations further comprising:

performing a second blocking scheme that redistributes a blocking rate among a plurality of active voice lines.

12. The non-transitory computer-readable storage medium of claim 8, wherein the voice traffic is treated with a highest priority by the base station versus the data traffic.

13. The non-transitory computer-readable storage medium of claim 12, wherein the voice traffic and the data traffic use separate queues at the base station.

14. The non-transitory computer-readable storage medium of claim 8, wherein the network is a wireless access network.

15. An apparatus for allocating a bandwidth for a network, the apparatus comprising:

a processor of a base station; and a computer-readable medium storing a plurality of instructions which, when executed by the processor, cause the processor to perform operations, the operations comprising:

determining a number of subscriber stations that the base station is capable of supporting in accordance with a performance objective for data traffic and a performance objective for voice traffic, wherein the performance objective for data traffic comprises an allowable peak rate, wherein the performance objective for voice traffic comprises a load per voice line, wherein the determining is performed using an equivalent bandwidth model; and allocating the bandwidth in accordance with the number of subscriber stations that the base station is capable of supporting.

16. The apparatus of claim 15, the operations further comprising:

monitoring an actual load for each of the subscriber stations;

monitoring an actual blocking for each of the subscriber stations;

determining whether each of the subscriber stations is conforming or non-conforming to a negotiated load level for each of the subscriber stations; and determining whether or not each of the subscriber stations is blocked in accordance with a negotiated blocking target.

17. The apparatus of claim 16, the operations further comprising:

applying a first blocking scheme to a subscriber station of the subscriber stations that is determined to be non-conforming so that the subscriber station that is determined to be non-conforming is limited to the negotiated load level for the subscriber station that is determined to be non-conforming.

18. The apparatus of claim 17, the operations further comprising:

performing a second blocking scheme that redistributes a blocking rate among a plurality of active voice lines.

19. The apparatus of claim 15, wherein the voice traffic is treated with a highest priority by the base station versus the data traffic.

20. The apparatus of claim 19, wherein the voice traffic and the data traffic use separate queues at the base station.

* * * * *